United States Patent [19]
Langill

[11] Patent Number: 5,154,205
[45] Date of Patent: Oct. 13, 1992

[54] METHOD AND APPARATUS FOR MAINTAINING LEVEL OF WATER IN ABOVE-GROUND SWIMMING POOLS

[76] Inventor: Edwin R. Langill, 162 Nashua Rd., Pepperell, Mass. 01463

[21] Appl. No.: 816,216

[22] Filed: Jan. 3, 1992

[51] Int. Cl.⁵ ...................... F16K 21/16; F16K 21/18
[52] U.S. Cl. ........................ 137/393; 4/508; 4/509; 137/403; 137/406; 137/414
[58] Field of Search ............ 4/508, 509; 137/393, 137/403, 406, 412, 414, 426, 428; 251/45, 46

[56] References Cited

U.S. PATENT DOCUMENTS

| | | | |
|---|---|---|---|
| 2,739,939 | 3/1956 | Leslie | 137/428 |
| 2,809,752 | 10/1957 | Leslie | 137/428 U X |
| 3,739,405 | 6/1973 | Schmidt | 137/428 |
| 3,908,206 | 9/1975 | Grewing | 137/428 |
| 4,211,249 | 7/1980 | Richards | 4/508 |
| 4,373,220 | 2/1983 | Selsted | 4/508 |
| 4,607,658 | 8/1986 | Fraser et al. | 4/508 |
| 4,621,657 | 11/1986 | St. Ledger | 4/508 |
| 4,655,243 | 4/1987 | Keller | 4/508 |
| 4,686,718 | 8/1987 | Kinkead et al. | 137/428 |
| 4,735,230 | 4/1988 | Detloff | 4/508 |

Primary Examiner—George L. Walton
Attorney, Agent, or Firm—Nields & Lemack

[57] ABSTRACT

The water level of an above-ground swimming pool is maintained at a predetermined level by a small tank attached to the edge of the pool. The tank bottom has an aperture for a conduit to the pool through the side wall thereof, whereby the level of the water in the tank is the same as the level of the water in the pool. The pressure sensor switch is designed to open when the water level in the pool falls below a predetermined amount, and to close when the water level is restored thereto. The pressure sensor switch is activated by the level of the water in the tank, but when open delivers water from the house line directly to the pool.

8 Claims, 12 Drawing Sheets

METHOD AND APPARATUS FOR MAINTAINING LEVEL OF WATER IN ABOVE-GROUND SWIMMING POOLS

BACKGROUND OF THE INVENTION

1. Field of the Invention

The invention relates to above-ground swimming pools and comprehends maintaining the level of water in such swimming pools at the proper height.

2. Description of the Prior Art

Above-ground swimming pools are in common use. They are filled with water by special inlet conduits or simply by making use of a common garden hose to fill the pool initially and to replenish the water from time to time as the level drops owing to evaporation, splashing by occupants of the pool, and the like. It is generally convenient to maintain the level of the pool at the proper height by automatic means, but such automatic means as has previously been proposed has either been undesirably expensive or else subject to various defects. Apparatus within the pool is subject to damage by the rough action of the occupants of the pool and also occupies valuable space. Apparatus outside the pool, unless compact, also occupies valuable space. Some prior art devices require substantial modification of the existing pool wall or of the existing conduits, and the switching mechanism of some prior art devices tend to "hunt" or otherwise malfunction. Devices described in the prior art for maintaining the level of water in above-ground swimming pools include the following:

U.S. Pat. No. 3,908,206 to Grewing discloses a device which includes a water tank located adjacent the upper rim of an above-ground swimming pool. A body of water in this tank is connected by a pipe to a body of water in the swimming pool. This pipe extends from an aperture in the bottom of the tank to an aperture in the side of the swimming pool; it appears that this aperture in the side of the swimming pool must be specially provided. The function of this pipe is to equalize the water levels in the pool and in the tank. A water supply line connected to a float valve in the tank provides make-up water for the swimming pool when the water level in the pool falls below a predetermined height of the water level in the tank. The desired height is set by suitably elevating or lowering the tank in accordance with calibrated indicia.

The principal defect of this construction is the fact that the make-up water is supplied to the tank, the capacity of which is much smaller than that of the swimming pool. When the level in the swimming pool, and therefore the level in the tank, falls below a predetermined level, the float valve opens and water flows from the water supply line into the tank. However, if the water in the supply line is under the usual pressure, as is necessary if the pool is to be refilled reasonably promptly, the flow from the supply line will greatly exceed the flow which exits from the tank through the pipe. Consequently, the level of the water in the tank is restored to the proper height quickly, before any appreciable change has occurred in the level in the pool. As a result, the float valve is closed soon after it has been opened. As water continues to flow through the pipe as a result of gravity feed due to the difference of water levels as between the pool and the tank, the level in the tank will again fall to a level at which the float valve opens. Thus the float valve "hunts": it opens and closes frequently until the level in the pool is restored. This "hunting" action causes undue wear and tear on the float valve. The "hunting" action does not depend on the type of valve used, and would occur no matter what type of valve is used. Indeed, such "hunting" action would be even more deleterious in the case of a pressure-sensitive valve.

Moreover, even though the device of Grewing uses the same conduit (pipe) to sense the water level and to fill the pool, a special aperture must be provided in the swimming pool.

U.S. Pat. No. 4,185,333 to Ortega discloses a device which controls flow at a spa rather than the flow at a pool. As appears from FIG. 2 of this patent, dirt from the top goes through the entire flow-control device on the way to the filter, and the resulting obstruction of flow would render this device inoperable.

U.S. Pat. No. 4,373,220 to Selsted discloses a device which does not function while the system is operating, as is clear from the "Abstract".

U.S. Pat. No. 4,621,657 to St. Ledger discloses a device suitable for use in a big commercial pool, and it requires a lot of space. It is not suitable for an above-ground swimming pool; rather it is designed for an in-ground construction.

U.S. Pat. No. 4,972,530 to Synder discloses a device which is intended to be installed when the pool is constructed. The device is mounted inside the pool, and is therefore subject to damage by the occupants of the pool. Even the creation of waves in the pool can trigger undesired operation of the flow-control device.

U.S. Pat. Nos. 3,895,645; 4,065,095; 4,180,096; and 4,240,606 to Johnson disclose pressure-sensitive valves of a construction which, when properly modified, may be used as the pressure-sensitive valve of the present invention.

SUMMARY OF THE INVENTION

The present invention uses head pressure and house water pressure to turn the water supply on and off in order to maintain a constant water level in an above ground pool or tank without the use of electricity. It is the difference between head pressure and the force exerted by a spring which activates the system. The invention is adapted for use with an existing above-ground swimming pool and includes a small tank containing a pressure-sensitive switch which is activated by the difference between head pressure at the bottom of the tank and the force exerted by a settable spring. The resulting valve action operates on a supply conduit which runs from the water supply, through the valve, and to the pool. In a preferred embodiment this supply conduit runs from the valve up over the top of the tank and thence over the top of the pool. This is the power line. The information line is a separate conduit which runs from the bottom of the small tank through an existing aperture through the side of the pool or an additional aperture in the side of the pool. In one embodiment of the invention, an existing aperture is used, such as the aperture through which water returns to the pool from the filter. In such a construction, the information or sensing conduit passes through the wall of the return-flow conduit, either by means of a Y-connection or by means of a special mount.

DETAILED DESCRIPTION OF THE INVENTION

Figure 1:
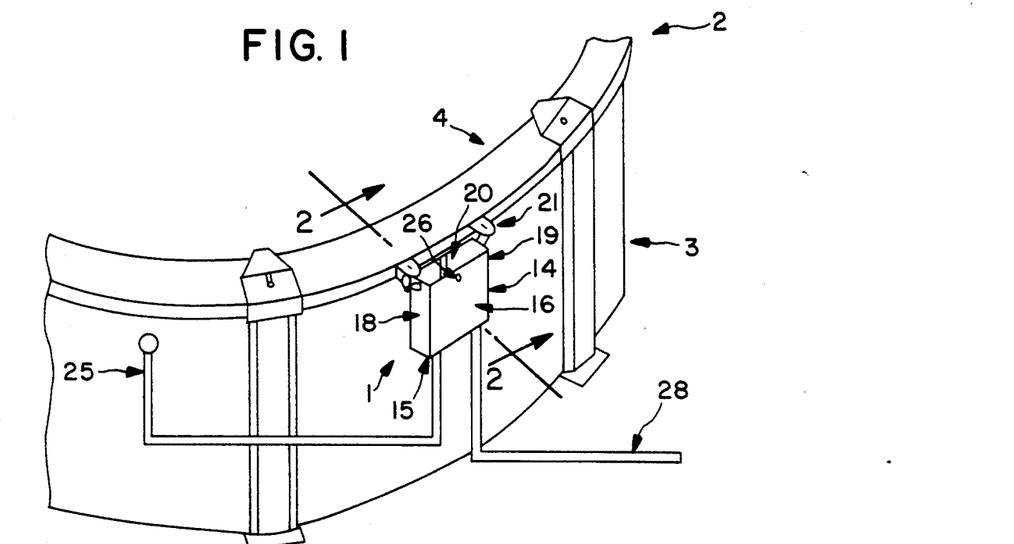
FIG. 1 is an isometric perspective view of the water level keeper installed on a conventional above-ground swimming pool.
Figure 2:
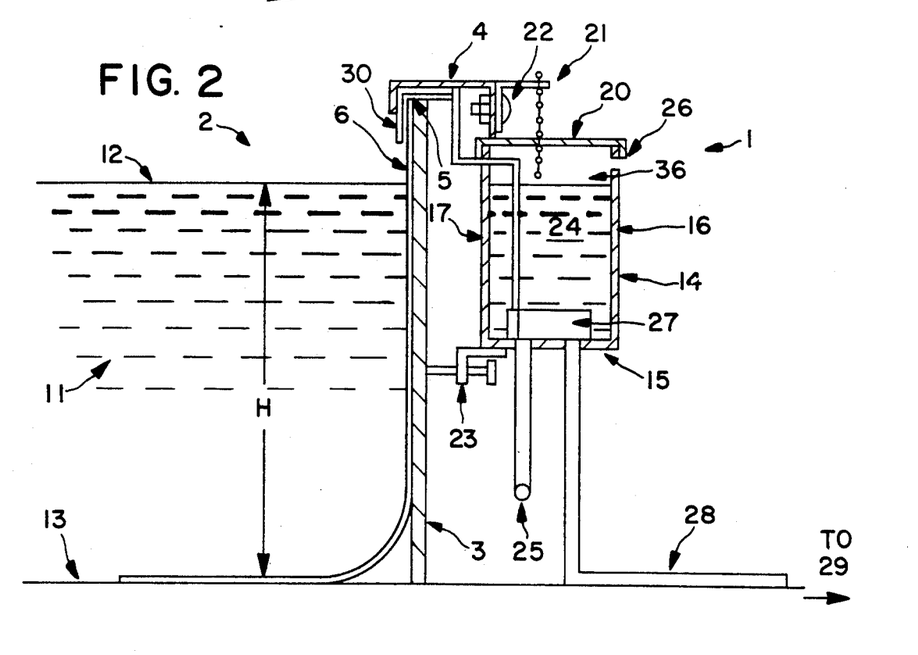
FIG. 2 is a sectional view of the water level keeper of FIG. 1 to an enlarged scale, the plane of the section being indicated by the line 2—2 in FIG. 1.
Figure 3:
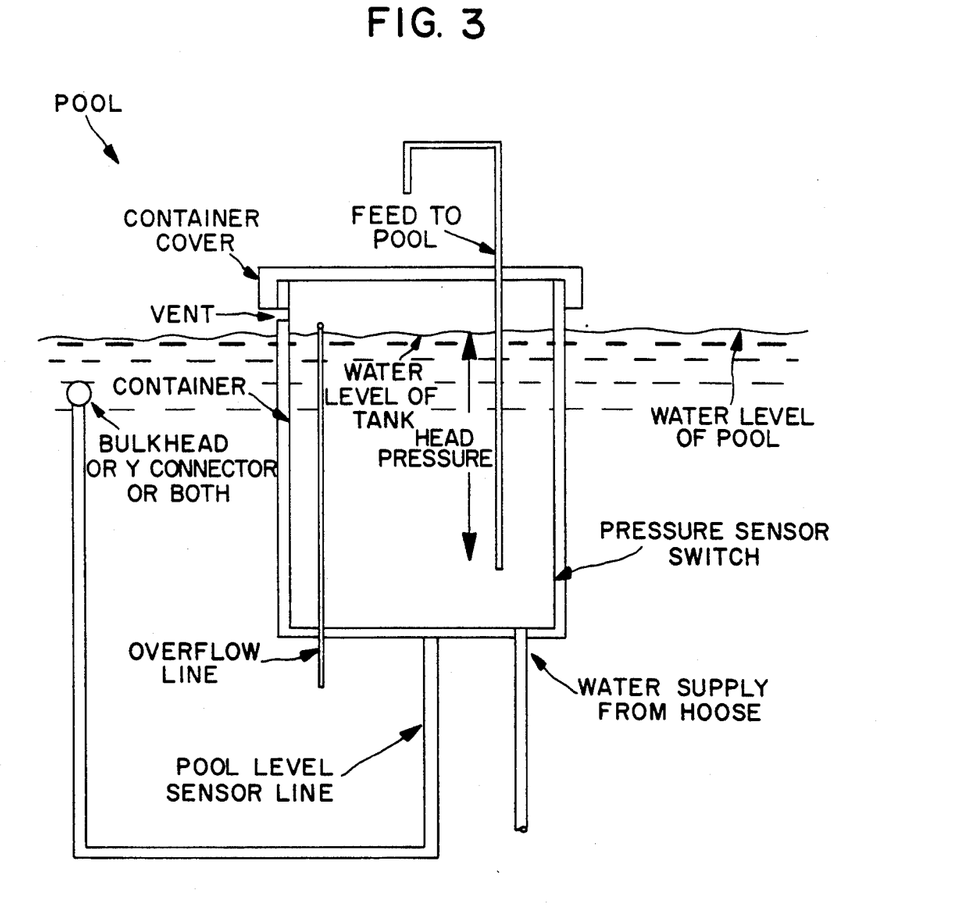
FIG. 3 is a diagrammatic view similar to FIG. 2 and indicating the principles of the invention.

Referring to the drawings, and first to FIGS. 1 and 2 thereof, the apparatus of the invention, generally designated by the reference numeral 1, is intended for use with a conventional above-ground swimming pool 2 having vertical walls 3 of metal, plastic or wood with an upper rim 4 to which is affixed the edge 5 of a liner 6 of a suitable material such as vinyl.

As is well known, the pool is filled with water 11 to a level 12 which is to be maintained at a suitable height H above ground level 13 and several inches below the rim 4. Various events cause this water level 12 to change. The presence of swimmers displaces water and raises the water level, and various activities of the swimmers result in the loss of water over the sides. Evaporation uncompensated for by rainfall tends further to lower the water level and could, during an extended period of inattention, such as when the owner is on vacation, lead to an undesirably low water level conducive to high algae build-up and the like.

Figure 14:
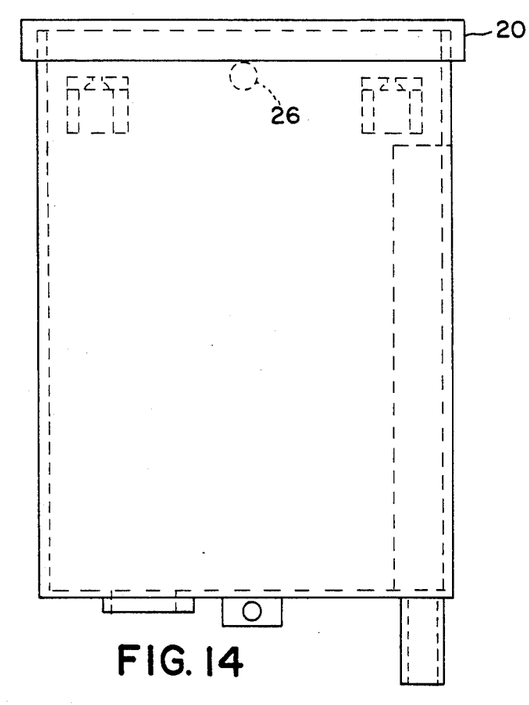
FIG. 14 is a front view of the tank.
Figure 15:
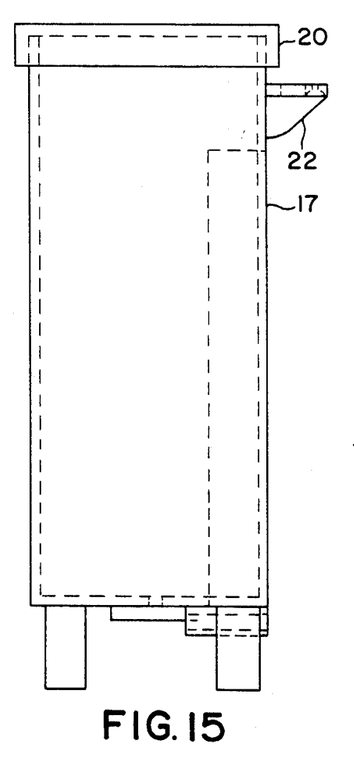
FIG. 15 is a side view of the tank.
Figure 16:
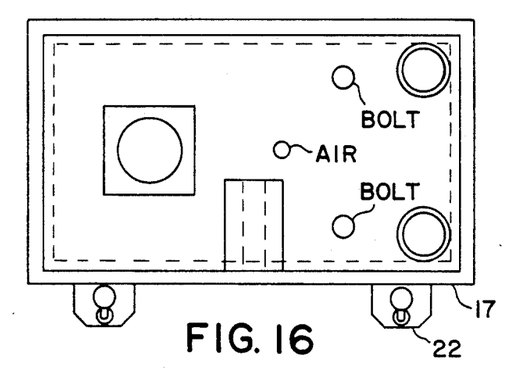
FIG. 16 is a bottom view of the tank.
Figure 17:
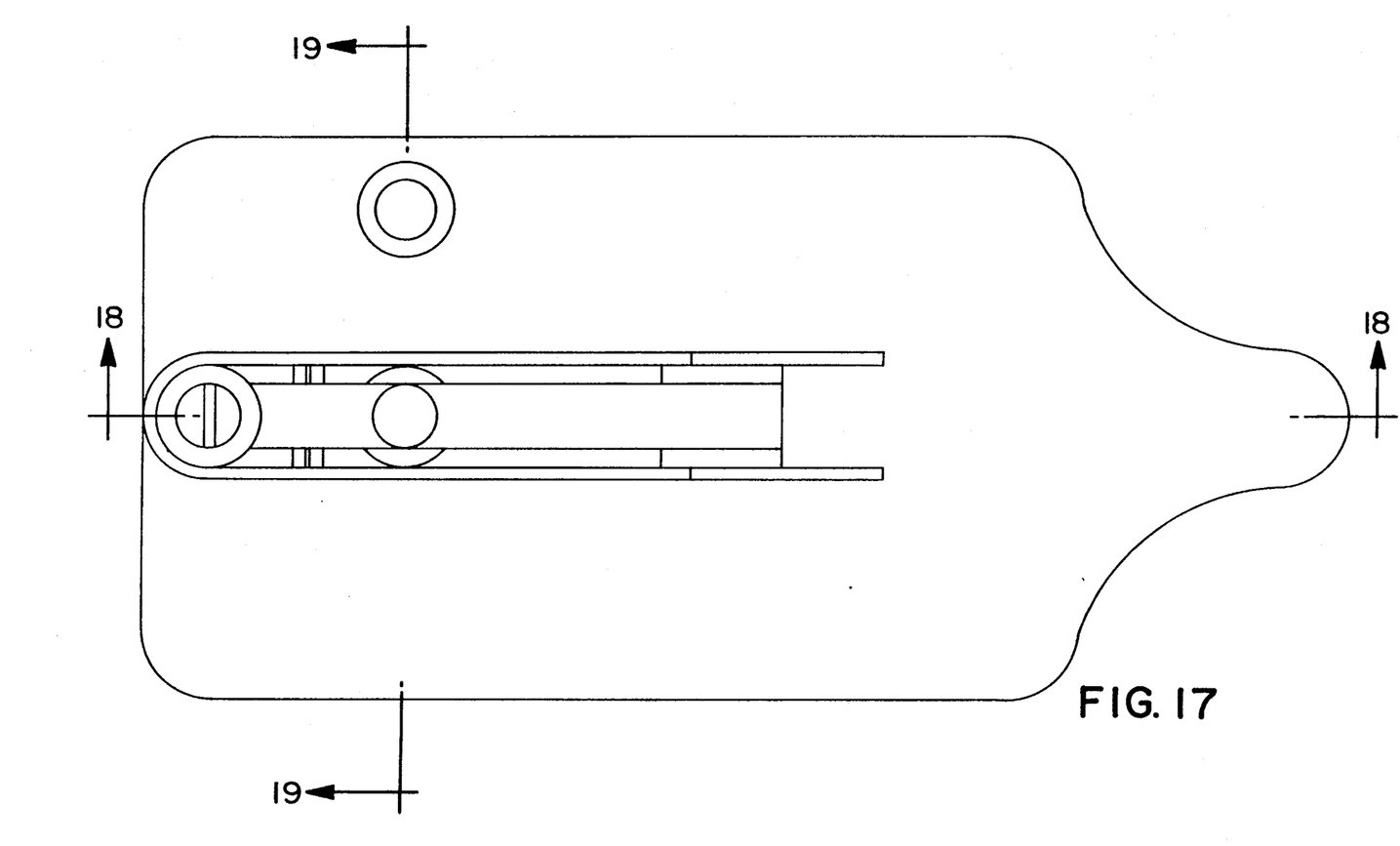
FIG. 17 is a top view of the pressure-sensitive switch of the invention.
Figure 18:
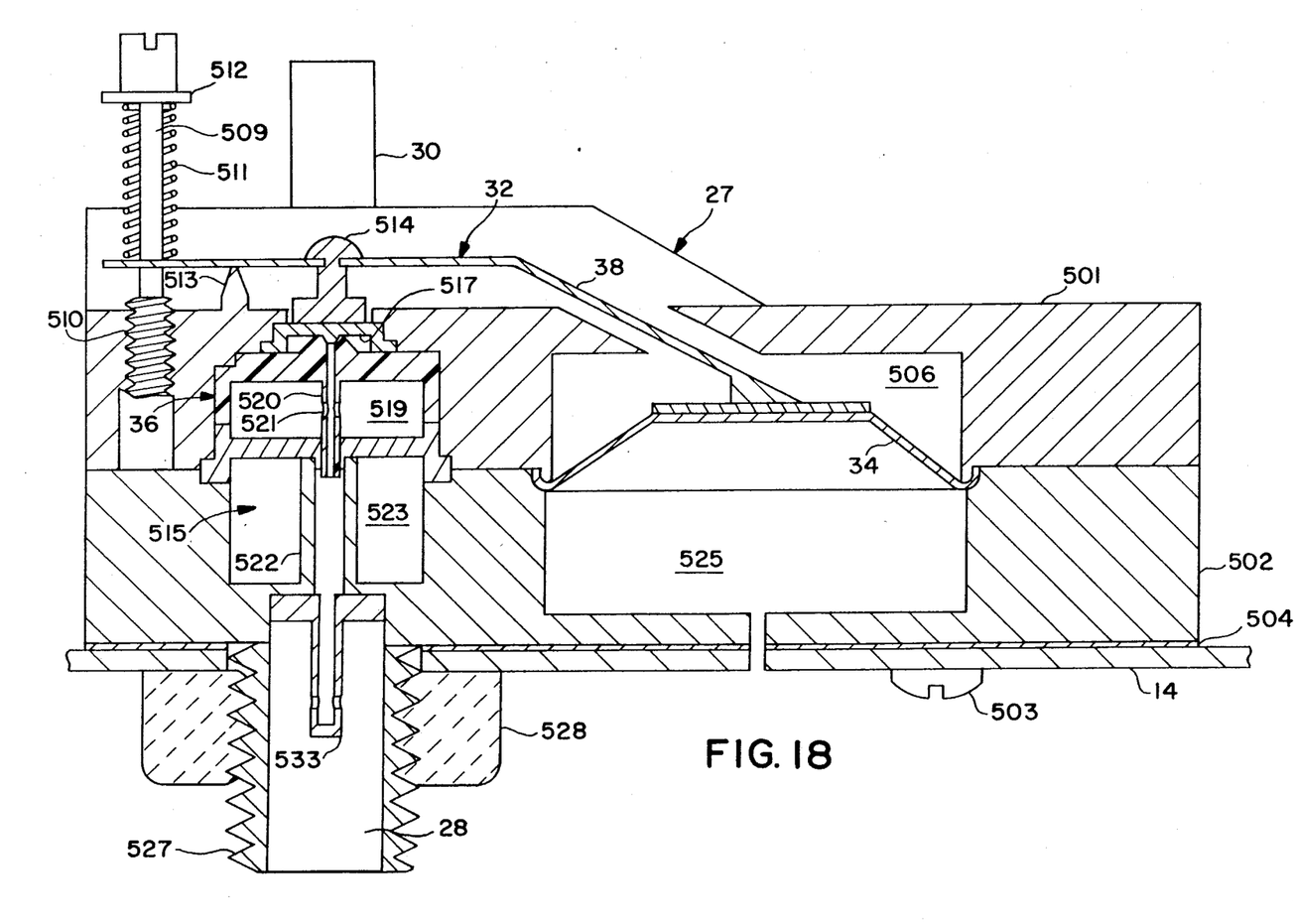
FIG. 18 is a sectional view along the line 18—18 of FIG. 17.

The apparatus 1 of the invention, which is to maintain the level 12 at the height H, includes a tank or container 14 which is attached to the side of pool 2 at the upper rim 4 thereof by any convenient means. The tank 14 is shown in greater detail in FIGS. 14-16 and includes a rear wall 17 to which a pair of brackets 22 is attached for mounting on the pool 2, and to which a tank leveling device 23 is also attached, as appears most clearly in FIG. 2.

The tank 14 contains a reservoir 24 of water in communication with the water 11 in the pool by means of a flexible hose or pipe 25. The pipe 25 causes the water level in the tank 14 to become equal to the water level in the pool 2, thus enabling the mechanism in the tank 14 accurately to sense the mean level of the pool water without distortion caused by splashing or by surface disturbances in the pool resulting from gusts of wind and the like and without injury from the strenuous activity of occupants of the pool. An opening 26 must be provided in the tank wall to afford a vent and overflow. In order to prevent dirt from entering the tank and damaging the switch, the top must be closed by a suitable cover 20 except for cleaning or adjustment. The pipe 25 acts as a pool level sensor line and is connected between an aperture in the bottom of the tank and an aperture in the side of the pool. In a preferred embodiment of the invention, an existing aperture in the side of the pool is used for this purpose.

The height of the water level in the tank 14 is sensed by a pressuresensitive switch 27 comprising various components to be described in detail hereinafter. The components of the switch 27 include a valve which can be activated to open a passageway for the flow of make-up water from a supply line 28 through the switch 27 through the pool feed pipe 30 to the pool 2 until the water level in the pool is restored to the desired height H. The supply line 28 is connected to a conventional water supply 29 from the house. The pressure sensor switch 27 is mounted at the bottom of the tank and connected through an aperture in the tank to the water supply from the house by a suitable fixture (shown in FIG. 5). The aforementioned passageway for the flow of make-up water includes a conduit which passes from the switch to the pool: for example, by passing over the top of the tank, and over the top of the pool. Since the flow through this conduit is under pressure from the water supply in the house, water flows into the pool easily when the switch is open. An overflow line prevents the water level in the pool or the tank from exceeding the desired height.

A component of the invention suitable for use in application of the invention to existing swimming pools is one which permits the sensing line to make use of the aperture in the wall of the swimming pool which is used for the return line from the filter. Flow of water in this line runs through a conduit into the pool. In accordance with this aspect of the invention 1 provide a special Y-connection wherein the stem of the Y is connected to the existing aperture in the wall of the swimming pool, one arm of the Y is connected to the existing line from the filter, and the other arm of the Y is connected to the sensing aperture at the bottom of the tank. Such a Y-connection is shown in FIGS. 4 and 5.

Figure 4:
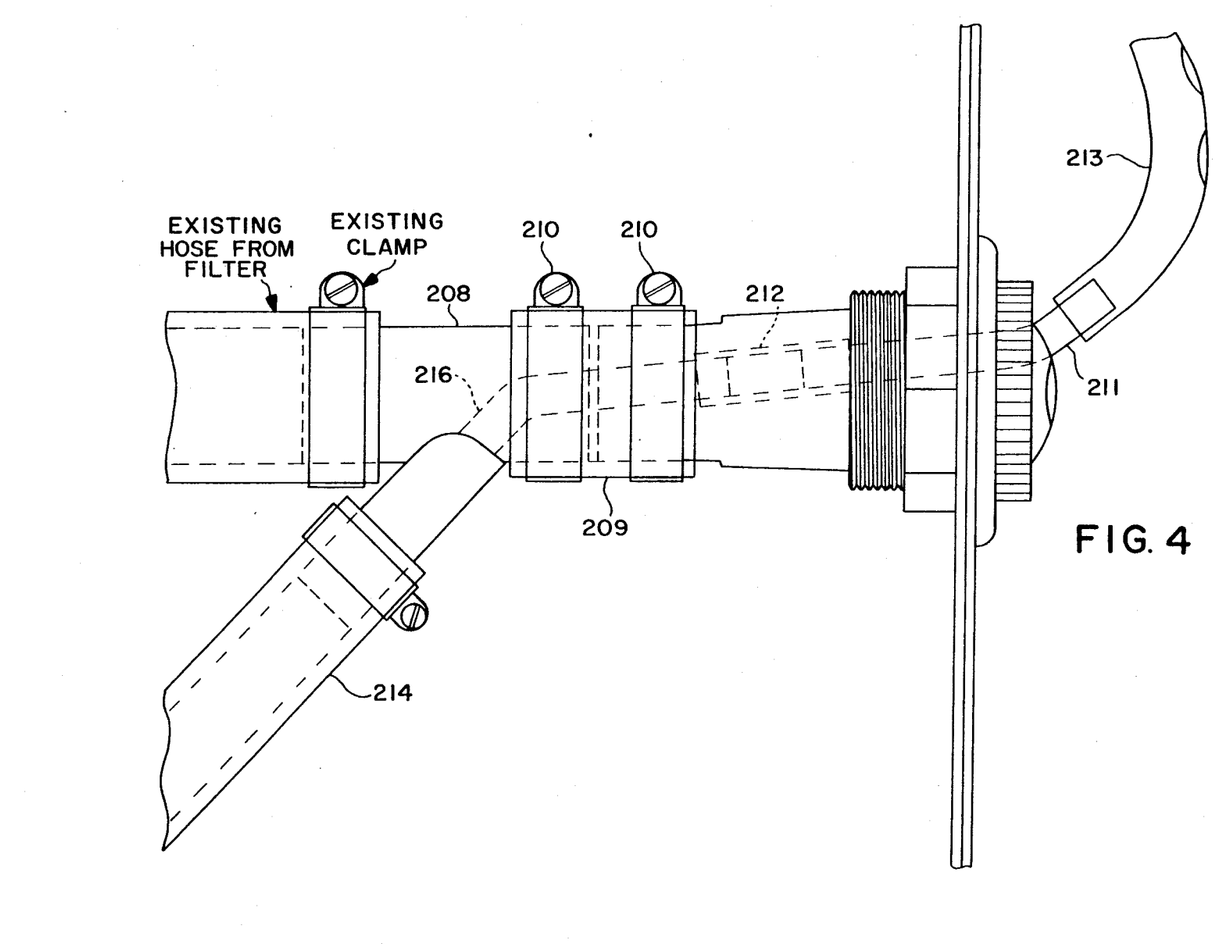
FIG. 4 is a somewhat diagrammatical view of a Y-connection suitable for use with the invention, including a view of a fitting suitable for use with the invention.
Figure 5:
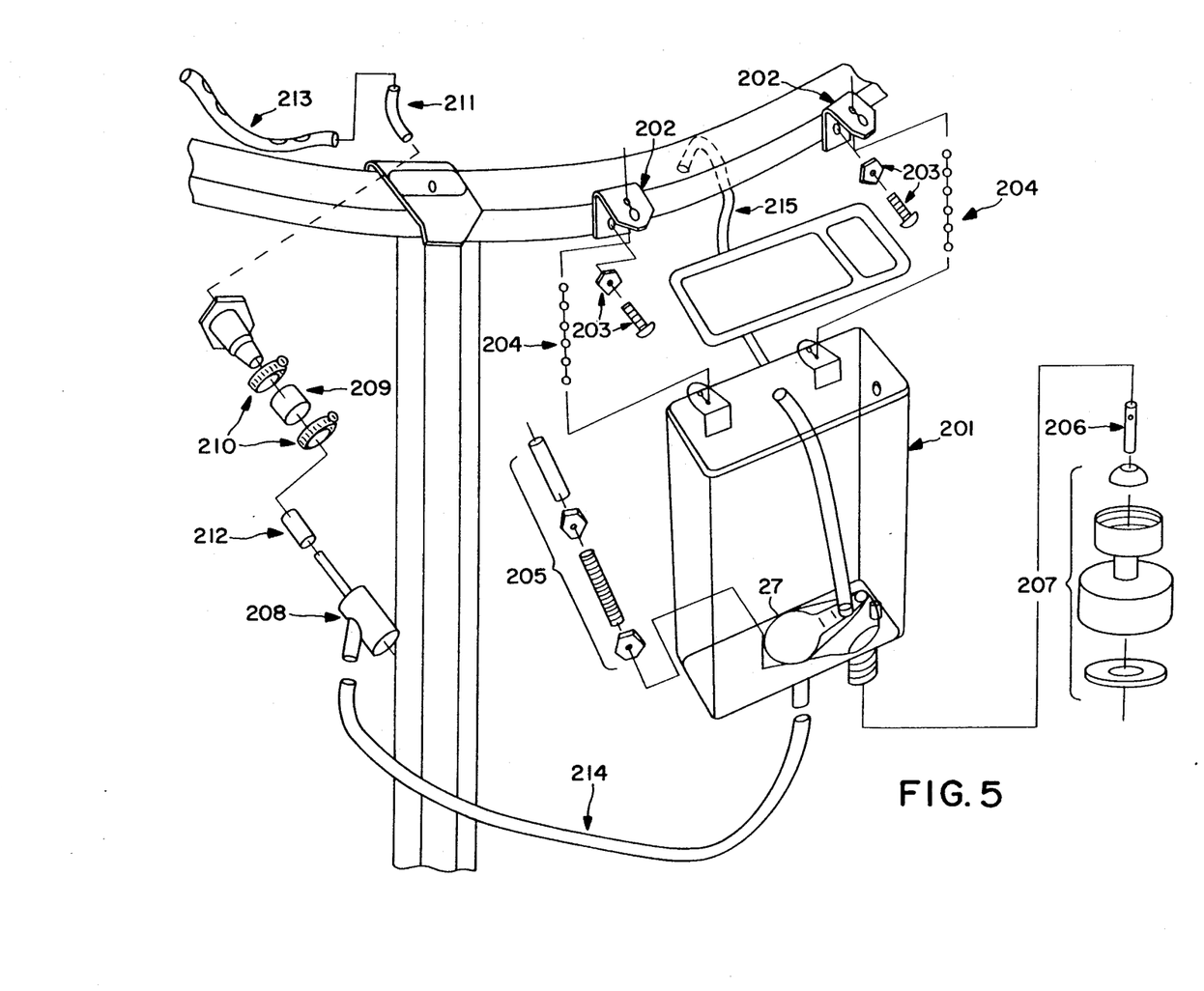
FIG. 5 is a view similar to that of FIG. 1 illustrating a manner of mounting the water level keeper of the invention on an existing structure.

Referring to FIGS. 4 and 5, the portion 214 of the sensor conduit which extends from the tank 201 to one arm of the Y 208 is of a diameter which is at least five-eighths of an inch, in order that variations in pressure may be transferred to the tank 201 with sufficient rapidity. The portion 216 of the sensor conduit which extends from the Y 208 to the interior of the swimming pool is of smaller diameter and passes, as it were, through the wall of the other arm of the Y 208 and thence through the stem of the Y 208. A suitable length 213, such as about six inches, of this sensor conduit is placed in the water of the swimming pool in following manner. The length of tubing 213 has a plurality of apertures in its wall; the location of the apertures and the configuration of the tubing must be such that the apertures are above the in-let fitting and spaced above the flow of water feeding the pool. At least one aperture must always be below the lowest operating water level of the pool, so that the length is always able to sense the pressure in the pool by sending a proper signal to the switch 27.

In the case of newly-designed pools, and in cases where suitably designed fixtures may be made, the structure shown in FIGS. 6-13 may be employed. Referring thereto, a conventional fitting, such as a Hydrostream Return Fitting manufactured by Hayward Pool Products, Inc. of Elizabeth, N.J., may be mounted in the return-flow aperture of the pool after being modified as follows.

Referring now to FIGS. 6-13, the mounting 301 therein shown includes an eye 302, an eye cap 303, an eye housing 304, a main flanged housing 305, a nut 306 and a Y-component 307. The body 308 of the main flanged housing 305 passes through aligned apertures in the wall 309 and in the liner 310 of the pool and is screwed onto the stem portion 311 of the Y-component 307. The stem portion 312 of the eye housing 304 is screwed into the body 308 of the main flanged housing 305 so as to abut against the stem portion 311 of the Y-component 307, and the eye 302 is placed so as to abut against the seat 313 of the eye housing 304. The eye cap 303 fits over the eye 302 and is screwed onto the flange 314 of the eye housing 304. By loosening the eye cap 303 the position of the eye 302 may be adjusted, and then held fast by tightening the eye cap 303.

Passages are drilled in the wall of the mounting in such a configuration as to provide as large a flow therethrough as is possible without unduly weakening the wall. Thus, a plurality of radially extending apertures 315 may be provided in the flange 316 of the main flanged housing 305 and corresponding longitudinally extending apertures 317 may be provided in the eye housing 304. The latter are connected to a circumferential aperture which is formed by a groove 318 in the Y-component 307, which in turn communicates with a single passageway 319 extending within the wall 320 of the Y-component 307 and thence outward through the smaller arm 321 which serves as a suitable mount for the sensor conduit 214 mentioned above: i.e., the one from the pool to the tank having an inner diameter of at least five-eighths of an inch. The structure of FIGS. 6-13 thus eliminates the need for a separate Y 208, since the structure of FIG. 6-13 itself forms the desired "Y" connection. Moreover, the structure of FIGS. 6-13 also eliminates the need for the length 213 in the water of the swimming pool.

Figure 6:
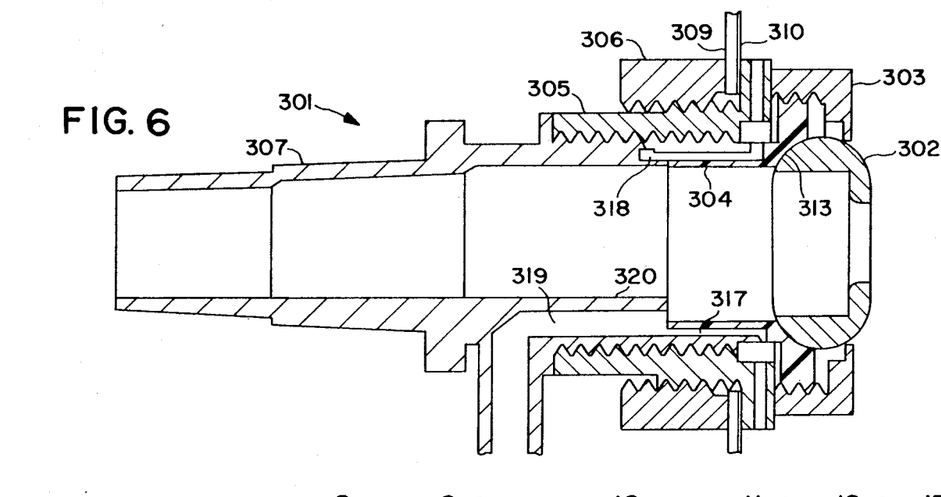
FIG. 6 is a central section of a special mounting incorporating the principles of the invention.
Figure 7:
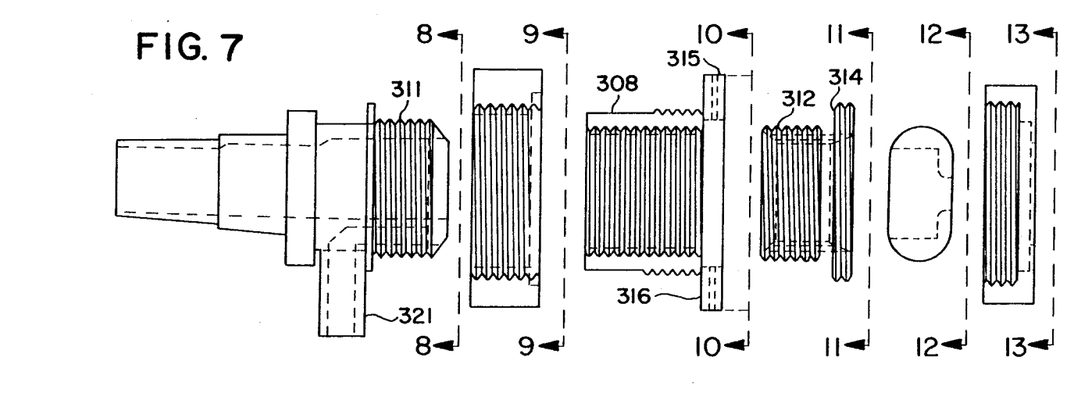
FIG. 7 is an exploded view, in central section, of the special mounting of FIG. 6, showing the various components thereof.
Figure 8:
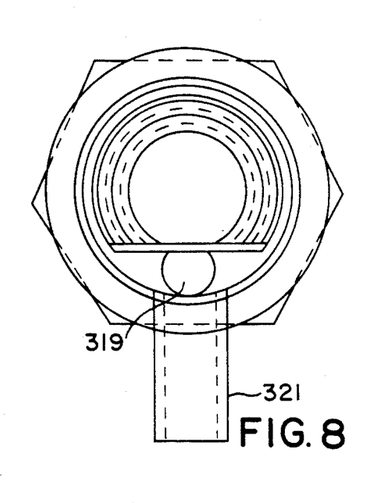
FIG. 8 is a view along the line 8—8 of FIG. 7.
Figure 9:
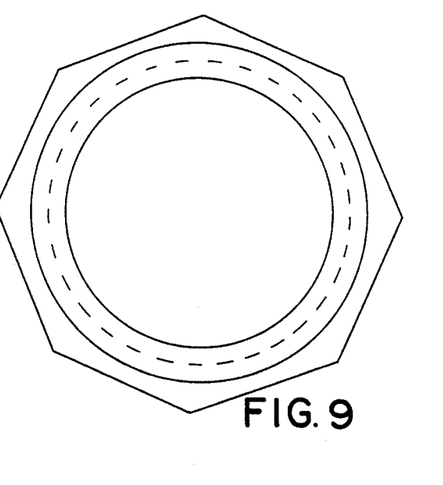
FIG. 9 is a view along the line 9—9 of FIG. 7.
Figure 10:
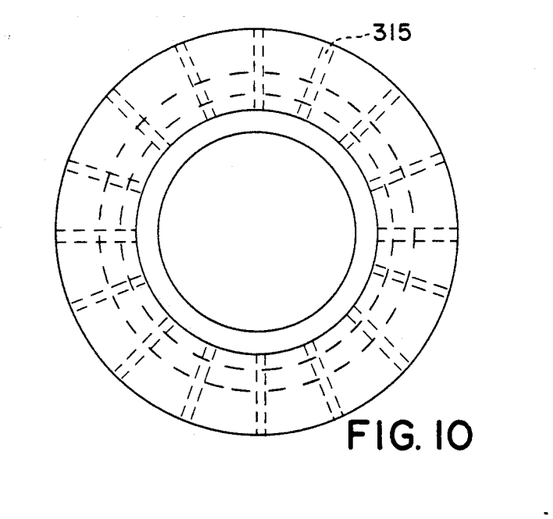
FIG. 10 is a view along the line 10—10 of FIG. 7.
Figure 11:
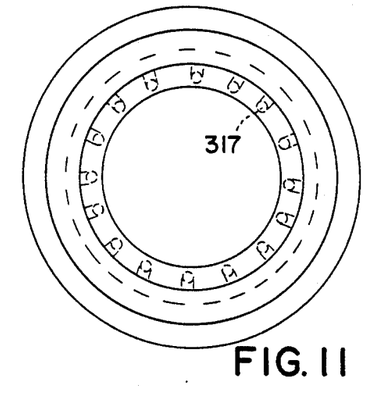
FIG. 11 is a view along the line 11—11 of FIG. 7.
Figure 12:
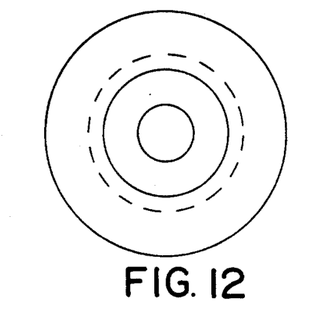
FIG. 12 is a view along the line 12—12 of FIG. 7.
Figure 13:
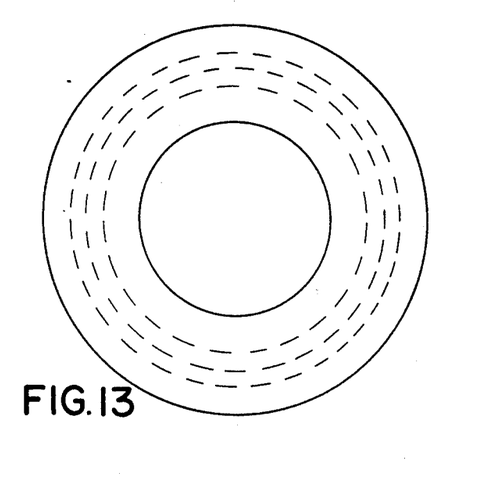
FIG. 13 is a view along the line 13—13 of FIG. 7.

A water-tight seal is provided between the flange 316 of the main flanged housing 305 and the liner 310 on the one hand and, on the other hand, between the nut 306 and the wall 309 of the pool by tightening the nut 306 on the body 308 of the main flanged housing 305. A second water-tight seal is provided between the eye cap 303 and the flange 316 of the main flanged housing 305, and a third water-tight seal is provided between the abutting ends of the stem portion 311 of the Y-component 307 and the stem portion 312 of the eye housing 304. These abutting ends are beveled as shown. After the eye cap 303 has been tightened on the flange 314 of the eye housing 304 so as to fix the position of the eye 302, further rotation of the eye cap 303 will rotate the eye housing 304 with respect to the inner threaded surface of the body 308 of the main flanged housing 305, so as to provide the aforementioned second water-tight seal (between the eye cap 303 and the flange 316). The aforementioned third water-tight seal is provided by rotating the stem portion 311 of the Y-component 307 with respect to the aforementioned inner threaded surface of the body 308 of the main flanged housing 305.

The assembly of the components of FIG. 7 so as to form the mounting 301 of FIG. 6 modifies a conventional fitting providing a large-aperture passage for the supply of water to the pool by creating a small-aperture passage which is disconnected and separate from the large-aperture passage, so that water can flow in the reverse direction, out of the pool, to provide the desired information about the water level in the pool. The small-aperture passage is formed by a combination of discrete radial passages, circumferential passages and discrete longitudinal passages. No matter what the angular position of the main flanged housing 305, at least one radially extending aperture 315 will extend essentially upward to permit the release of air within the small-aperture passage. The longitudinally extending apertures 317 terminate in short radial portions which communicate with the radially extending aperture 315 without the need for alignment therebetween by virtue of the circumferential passage formed between the stem portion 312 of the eye housing 304 and the flange 316 of the main flanged housing 305. Similarly, the circumferential groove 318 enables the discreet longitudinally extending apertures 317 to communicate with the single passageway 319.

While the principles of my invention may be used by pool manufacturers to incorporate them into ready-made structures, my invention may also be used to modify existing structures. Indeed, it is a feature of my invention that existing structures may be so modified simply and at modest expense. An example of such modification is illustrated in FIGS. 4 and 5. Referring thereto, a suitable kit for modifying an existing structure might include the following parts.

Container or tank 201 with cover, valve, hanging brackets and water level sensing bulkhead fitting with leveling bracket (1 each)

Hanging brackets 202 for the pool (2 each)

Nuts 203 (2 each) and bolts (2 each) for the hanging brackets

Leveling chains 204 (2 each)

Bottom leveling unit 205, including threaded rod (1 each), nuts (2 each), leveling tube (1 each)

Flow control 206 (1 each)

Valve 207 to water supply unit with two gaskets (1 each)

Y connector 208 (1 each)

1¼ to be mounted between the Y connector and the existing pool water return fitting (1 each)

Hose clamps 210 (2 each)

Small water sensing tube 211 (1 each)

Connecting hose 212 (1 each)

Pool water sensing hose 213 (1 each)

Sensing hose 214 to be mounted between the Y connector and the container or tank 201 (1 each)

In addition to the foregoing parts, suitable tools might include a straight screwdriver, a razor knife, an adjustable wrench, a tape measure, an electric drill and two drill bits (⅜ inch and 5/16 inch)

Modification of the existing structure may be made in the following manner, after deciding upon a suitable manner and location of attachment of the water-leveling unit. The best place is between the skimmer and the return water fitting on the pool. In any case the unit should not be more than three feet from the return fitting.

1. Layout all the parts for ease of identification.

2. Find a convenient place on the upper railing of the pool and drill two (2) 5/16 inch holes approximately 8 inches apart. Drill the holes so that the top of the bracket 202 is even with the top of the railing. FIG. 5 shows them too high, for purposes of clarity. If they are too high someone may hit them and hurt themselves or the brackets. Use items 203 and bolts to secure hanging brackets 202 to the top rail.

3. Take leveling chains 204 and drop them through the large holes in hanging brackets 202. Push the last round ball into the small recess and pull the bottom of the chain down until the chain is hanging straight down. Do this to both brackets.

4. Take the flow control 206 and place it in the valve 207. The flow control 206 goes in the domed gasket with the holes in the sides toward the top. Secure the valve 207 to the valve in the container hand tight. Do not over tighten.

5. Take the bottom leveling unit 205 and thread the two (2) nuts on to each end of the threaded rod. Thread the threaded rod into the leveling bracket on the bottom of the container. Use one (1) nut to secure the threaded rod to the leveling bracket and the other nut with plastic tube is used to adjust the container so that it hangs straight.

6. Take the sensing hose 214 and push it onto the stem in the center of the leveling bracket, as shown in FIG. 5.

7. Take the container or tank 201 and secure it to the pool with the hanging chains already installed in the pool hanging brackets. Hang one side of the container and then the other. Let the chains hang through the large hole in the bracket on the container. Push a ball into the small recess in the bottom of the bracket and pull the chain up until the ball seats and the chain hangs straight.

8. If the pool has a through-the-wall return water fitting, inside the pool is a directional fitting secured by a threaded cap. This fitting is ball like and looks like an eye. Remove the directional ball fitting by unscrewing the cap. Drill a 3/8 inch hole at approximately 45 degrees through the side of the directional fitting. From inside the directional fitting push the small water sensing tube 211 through the drilled hole. Do not reassemble.

9. Slide the connecting hose 212 onto the small water sensing tube 211.

10. Get a flat piece of plastic, such as a cover for a can of coffee, and cut a circle to fit the inside of the cap that holds the directional ball. Reinstall the cap (minus the directional ball). This will create a seal.

11. Remove the hose from the return water fitting and lay the hose over the railing into the pool. Take the Y connector 208 and push the thin tube into the return water fitting until it touches the plastic seal. If any of the small tube is still showing, cut that amount off plus an additional inch. (1 inch plus the part showing must be cut off.)

12. Secure the 1¼ inch hose 209 to the Y connector 208 with clamp 210.

13. Secure the 1¼ inch hose 209 to the existing return water fitting with clamp 210. Make sure that the Y connector is up against the end of the existing return water fitting. See FIG. 4.

14. Connect the sensing hose 214 to the small end of the Y connector 208.

15. Reconnect the hose from the filter to the water return fitting by connecting it to the Y connector 208. Use the same clamp that was originally used.

16. Take the directional ball fitting with the small water sensing tube 211 and the connecting hose 212 attached and re-install them in the return water fitting. Push the connecting hose 212 onto the small tube that is now in the return water fitting and seat the directional ball. Secure the directional ball with the cap. The plastic seal must be removed first.

17. Attach the pool water sensing hose 213 to the small water sensing tube 211 inside the pool and with the hole that the small water sensing tube 211 fits through aiming upwards, feed hose 213 up and under the upper railing of the pool at any convenient place. The hose 213 has holes in its side on both ends, so that it may be installed in either end. These holes must be above the return water fitting and below the water level.

18. Take the supply hose 215 and feed one end through the hole in the container as shown in FIG. 5 and attach it to the stem on the switch 27 in the container. lake the other end and feed it under the top railing of the pool and allow it to hang under the railing inside the pool.

It is important that the connecting sensor line 214 be arranged so that it describes a curve which dips downward between its extremities, as shown in FIG. 5, in order that any air which may form in the line 214 may readily be removed. Similarly, the line 213 inside the pool should be arranged to run upward from the connector 211, so that any air formed in this line 213 may readily be removed by exiting through the open end of this line 213.

A pressure sensor switch 27 suitable for use with the invention is shown in FIGS. 17-24. It may be similar to that disclosed in the aforementioned Johnson patents, but many of the details disclosed in said patents are unsuitable for the present invention. In general, the features of said patents which relate to flow into the tank of the toilet are unnecessary and possibly harmful, and therefore should be blocked off if present or omitted if a modified switch is manufactured. The features disclosed in said patents (but not claimed therein) which may be used with the present invention include the passageway from the inlet to that portion of the outlet which is directed into the bowl of the toilet and the valve mechanism itself. Features which are desirable in a toilet switch, such as enhanced force during closure of the valve, are to be avoided in the swimming pool application of the invention. Such enhanced force is a positive feature or advantage of the float-type valve when used in a toilet. Leakage caused by imperfect closure is undesirable in a toilet, but immaterial and possibly beneficial in the case of a swimming pool. Moreover, the aforementioned problem of "hunting", which can result when the flow controlled by the switch is directed into the sensor tank and not into the swimming pool itself, is aggravated by use of a pressure-sensitive switch.

The essential components of the valve shown in FIGS. 17-24 include a diaphragm chamber and a valve chamber. The diaphragm chamber contains a diaphragm which divides the chamber into an upper region communicating with the bottom of the tank and therefore at tank-bottom pressure and a lower region communicating with the atmosphere so as to compensate for variations in atmospheric pressure. The diaphragm is mounted on a lever which pivots about a fulcrum. The end of the lever opposite to that upon which the diaphragm is mounted is connected to a spring which opposes the action of the tank-bottom pressure. A portion of the lever near the fulcrum and on that side of the lever which is the same as that on which the diaphragm is mounted is connected to a pilot valve member. When the tank-bottom pressure falls below the predetermined threshold, the movement of the lever opens the pilot valve by lifting the pilot valve member away from the pilot valve seat. This opens an exit passage from a valve chamber which causes water within the valve chamber to leave it at a rate of flow greater than that permitted through the entrance passages thereto, which communicate with the water supply at inlet pressure. The main valve, which is of special design, then opens and permits the "power" flow to occur. When the desired tank-bottom pressure is restored, the lever closes the pilot valve, and the pressure within the valve chamber rises to the inlet pressure, and the main valve closes. Details of the aforementioned valve operation are disclosed in the aforementioned Johnson patents.

In general, the pressure sensor switch 27 includes an inlet 28 communicating with the supply conduit, an outlet 30 communicating with the conduit to the pool, and a valve assembly generally designated as 32 disposed in the flow path between the inlet and the outlet. A diaphragm 34 detects level changes of the liquid within the tank and a control assembly 36 including a control lever 38 operates the valve assembly 32 in response to diaphragm movement in order to open the valve assembly when the liquid level is below the predetermined level and to close the valve assembly when the liquid level reaches the predetermined level.

Proceeding now to a more detailed description of the structure and operation of the pressure sensor switch 27, and referring to FIGS. 17-24, the switch of my invention includes an upper block 501 and a lower block 2 which are bolted to the bottom of the container 14 by screw-bolts 503. A suitable gasket 504 is positioned between the lower block 502 and the container 14, so that when the bolts 503 are tightened by screwing them into the threaded sockets 505 in the upper block 501 a water-tight fit is maintained between the upper block 501, the lower block 502, the gasket 504 and the container 14.

Prior to assembly of the upper block 501 and the lower block 502, various components are inserted in the hollows within the blocks 501, 502. Within the upper chamber 506 formed within the upper block 501 there is positioned a lever 38 upon the extremity of which there is attached a lever diaphragm 34 the periphery of which is sealed between the upper block 501 and the lower block 502 in a water-tight manner. The opposite end of the lever 38 is mounted on a screw-bolt 509, which in turn is screwed into a threaded socket 510 in the upper block 501. A spring 511 is mounted on the screw-bolt 509 between a collar 512 and the lever 38, and a force down on this end of the lever 38 is created and controlled by adjustment of the screw-bolt 509. The lever 38 is supported on a fulcrum 513, and a cap 514 is fixed upon the lever 38 at a location and for the purpose which will now be described.

Additional hollows in the blocks 501, 502 form a valve chamber 515, within which a main valve and a pilot valve are formed by means of a main valve diaphragm 516 and a pilot valve diaphragm 517, respectively. A valve member 518 separates the main valve diaphragm 516 from the pilot valve diaphragm 517 and forms a control chamber 519. The valve member 518 includes a central tube 520 which has a number, such as two, of apertures 521 in its wall which serve to provide communication between the interior of the tube 520 and the control chamber 519. The formation of the lower block 502 is such that an annular space 523 is provided about a central inlet tube 522, and this annular sPace is in communication with the outlet 30. The main valve diaphragm 516 is slidably supported on the tube 520, and the contact between the main valve diaphragm 516 and the tube 520 need not be water-tight. lhe passageway within the tube 520 continues upward and terminates in a pilot valve seat 524 against which the pilot valve diaphragm 517 is pushed by the cap 514 when the lever 507 is in the corresponding position. The lower chamber 525 is open to the atmosphere through the vent 526. The lower block 502 is provided with a threaded projection 527 upon which a nut 528 acts to prevent leakage in this area.

The upper chamber 506 is in communication with the lower portion of the container 14, so that the water pressure upon the upper surface of the lever diaphragm 34 pushes that end of the lever 38 downward against atmospheric pressure. This pressure is opposed by the pressure exerted by the spring 511. As the water level in the pool lowers, the pressure in the lower portion of the container 14 falls, and the diaphragmed end of the lever 38 rises. This motion lifts the cap 514 so as to release the pilot valve diaphragm 517 from the pilot valve seat 524. The pressure of the water in the inlet 28 pushes the pilot valve open in this manner, and the water then escapes through the outlet 30 via the groove 530 in the valve member and the hole 531 in the upper block 501. Some water in the control chamber 519 also flows out through the tube 520 via the apertures 521, thereby lowering the pressure in the control chamber 519 and allowing the main valve diaphragm 516 to lift off the main valve seat 532. As a result of this action, a large flow of water occurs from the high-pressure inlet 28 through the main valve, the annular chamber, and the outlet 30.

Because the pressure in the inlet 28 is relatively great, 1 provide a protective shield member 533 to impede the flow towards the tube 520, so that the water does not rush against the relatively fragile end of the tube 520.

Although the pressure of the screw-bolts 503 compresses the upper block 501 against the lower block 502, portions of the interior of the switch 27 contain water under relatively high pressure, and so precautions must be taken to prevent escape of such water. Accordingly, in the embodiment shown in the drawings a gasket or O-ring 534 is provided in a groove 535 around the passage leading from the annular space about the central inlet tube 522 to the outlet 30. The interior of this region contains water under pressure, and the gasket 534 excludes this water from entering the contact area between the two blocks 501, 502. The shape of the main valve diaphragm 516 is designed to prevent direct flow of water from the aforementioned annular space to the contact area between the two blocks 501, 502, or from the control chamber 519 to the contact area between the two blocks 501, 502. The shape of the pilot valve diaphragm 517 similarly is designed to prevent direct flow of water from the pilot valve chamber to the upper portion of the upper block 501, which upper portion is in direct contact with the water in the container 14.

The switch of my invention differs from the Johnson valve in that all flow of liquid out of the switch is confined to the outlet 30, which corresponds to that portion of the Johnson valve which delivers water to the bowl of the toilet (e.g. item 192 in FIG. 3 of U.S. Pat. No. 3,895,645.) To accomplish this purpose, all apertures corresponding to those portions of the Johnson valve which deliver water to the tank of the toilet are blocked off in the switch of my invention. This means, for example, that water which flows from the control chamber 519 through the pilot valve of the switch of my invention when it is open must be suitably confined, whereas water which flows from the pressure control chamber 142 in FIG. 3 of U.S. Pat. No. 3,895,645 is allowed to escape into the tank of the toilet. The primary function of the Johnson switch is to deliver water to the very tank the pressure of which is sensed by the switch. In the switch of my invention it is vital that the water delivered from the switch be kept out of the tank the pressure of which is sensed by the switch, because that tank is small and would be filled prematurely: i.e., long prior to any necessary refilling of the swimming pool.

Figure 19:
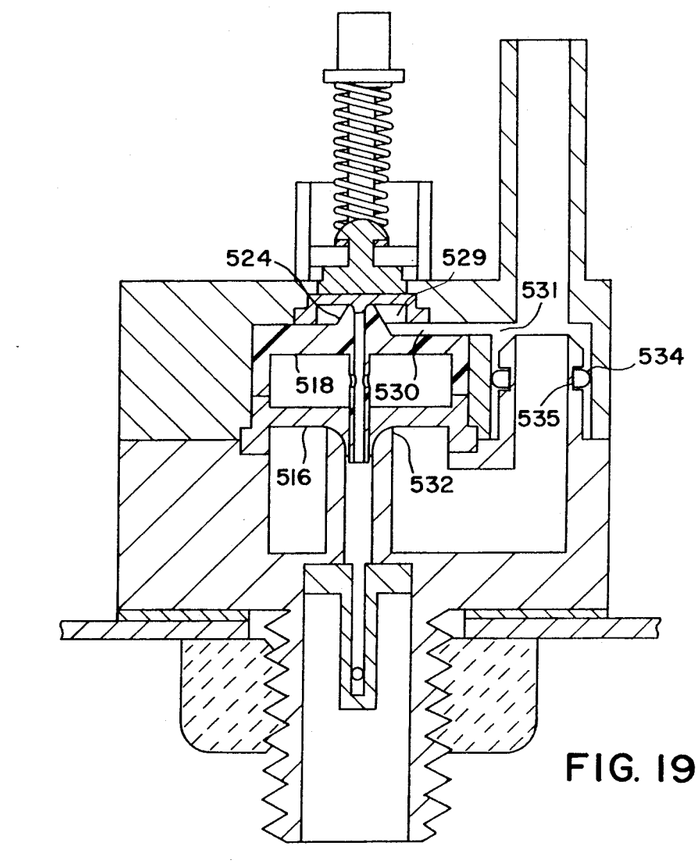
FIG. 19 is a sectional view along the line 19—19 of FIG. 17.
Figure 20:
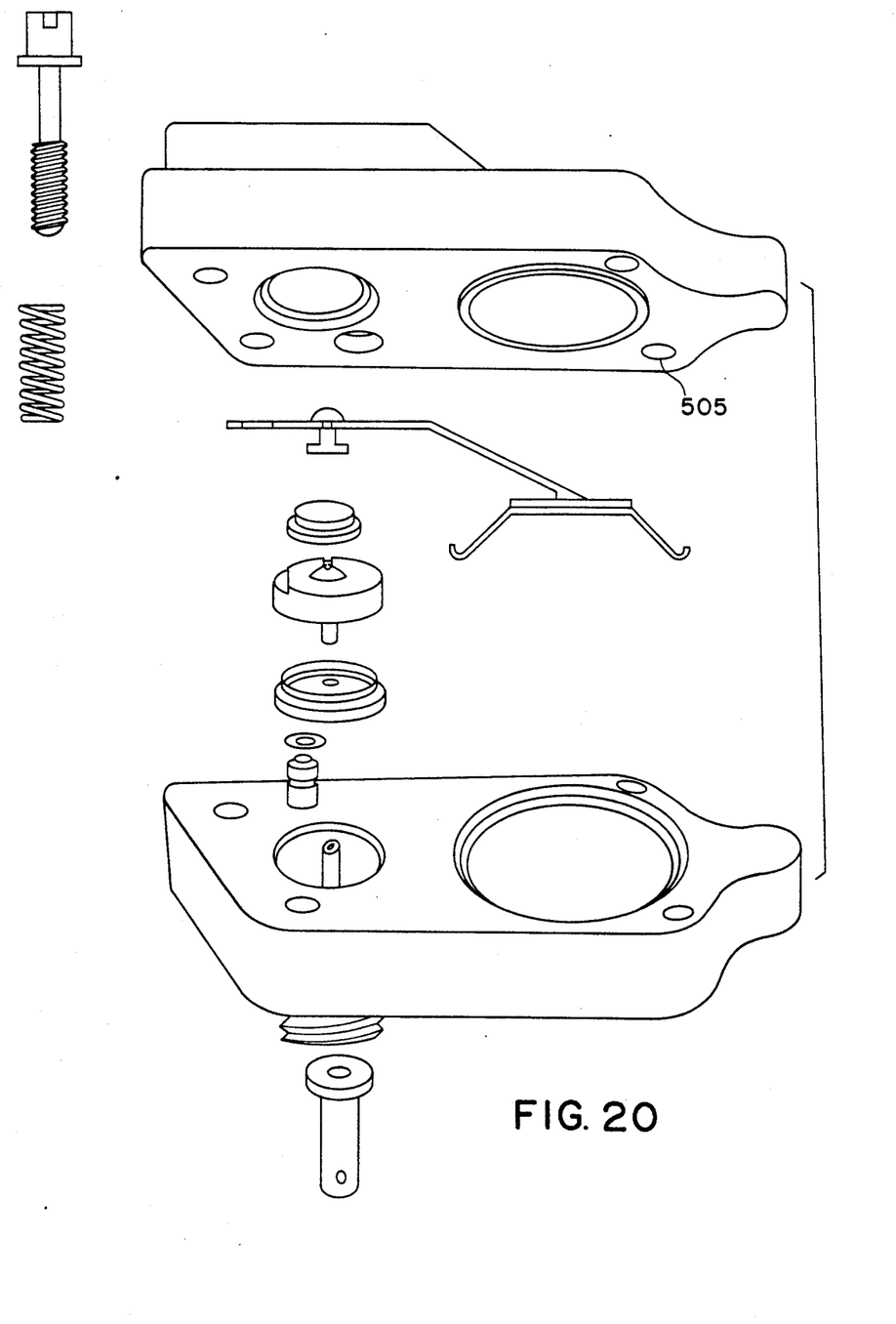
FIG. 20 is an exploded view, in perspective, of the switch of FIGS. 17-19.
Figure 21:
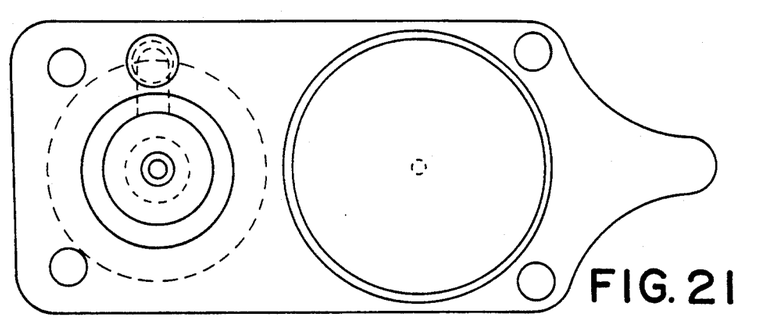
FIGS. 21-24 are details of the switch of FIGS. 17-20.
Figure 22:
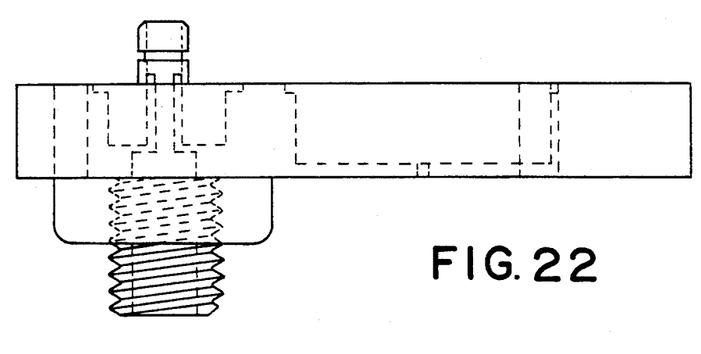
Figure 23:
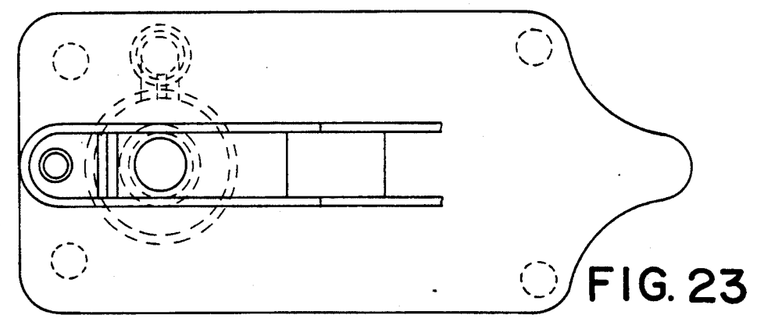
Figure 24:
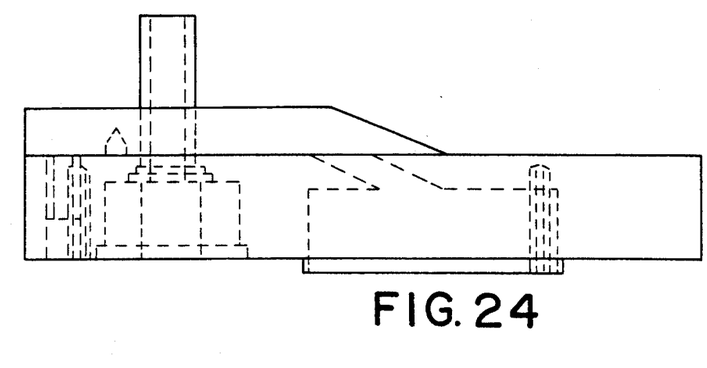

For the foregoing reasons, the pilot valve of the switch of my invention is constructed in a manner similar to the construction of the main valve of the switch of my invention. Referring to FIG. 19, the pilot valve of my invention includes a pilot passage chamber formed by the groove 530 and the hole 531 which is in communication with the outlet 30, but which is sealed off from the pressure sensing passage or upper chamber 506 by the shape of the pilot valve diaphragm 517, the outer periphery of which is sealed against its support just as the periphery of the main valve diaphragm 516 is sealed against its support.

Also, for the foregoing reasons, the switch of my invention includes a gasket 534 as shown in FIG. 19, which, as explained hereinabove, assists in confining water entering the switch from the sensor line and prevents it from flowing out into the container 14.

When the main valve opens, water from the supply line 28 is permitted to flow up into the annular space 523 about the central inlet tube 522 and thence to a passageway leading to the outlet 30. Similarly, when the pilot valve opens, water from the control chamber 519 and from the supply line 28 is permitted to flow up into the pilot passage chamber 529 and thence to a passageway leading to the outlet 30.

Having thus disclosed the principles of the invention, together with illustrative embodiments thereof, it is to be understood that, although specific terms are employed. They are used in a generic and descriptive sense, and not for purposes of limitation, the scope of the invention being set forth in the following claims.

I claim:

1. Apparatus for maintaining the water level in an above-ground swimming pool at a predetermined height, wherein said swimming pool includes a recycling system having a skimmer, a filter, a recycle conduit and a pump adapted to deliver recycled water to said pool through a recycle aperture, comprising in combination with such a swimming pool: a small tank supported outside but near said pool and at said predetermined height, a water-pressure-sensitive switch withins aid tank near the bottom thereof, said switch having an entrance and an exit, means for supplying water under pressure to said entrance, a supply conduit from said exit into said pool, whereby water flows through said switch into said pool when said switch is open through a path which doesnt to communicate with the water in said small tank but not when said switch is closed, said switch responding solely to the head of pressure in said small tank in such a manner that whenever the level in the pool drops, thereby causing the level in the small tank to drop correspondingly, said switch is actuated in response to the consequent drop in the head of pressure ins aid small tank so as to supply the flow of water into said pool, and a water-pressure information conduit extending from said pool through said recycle aperture, said recycle conduit and out of said recycle conduit and to an information aperture in the wall of said small tank, whereby the level of water in said tank is maintained at the same level as that of the water in said pool, said switch being set so as to open said switch whenever the level of water in said tank falls below a predetermined height and to close said switch when said level has been restored to said predetermined height, said information conduit having a portion extending into said pool and having at least one aperture which is below the level of the water in said pool at all times during operation of said apparatus, so that there is a continuous flow of water between said pool and said small tank.

2. Apparatus in accordance with claim 1, wherein said recycled water is delivered to said pool through a recycling conduit and wherein said information conduit passes through a wall of said recycle conduit and thence through said recycling conduit as it passes through said recycle aperture and thence a substantial distance into said pool.

3. Apparatus in accordance with claim 2, wherein the wall of said information conduit at the portion thereof within said pool has apertures therein.

4. Apparatus in accordance with claim 1, wherein said recycle aperture includes a fixture having a tubular member acting as part of said recycling conduit and a flange member acting as a support for said recycling conduit on the interior of the wall of said pool, and wherein said tubular member and said flange member have interconnecting apertures in the walls thereof adapted to function as part of said information conduit.

5. Apparatus in accordance with claim 1, wherein the inner diameter of said information line at the portion thereof between the vicinity of said recycle aperture and the vicinity of said information aperture is not less than five-eighths of an inch.

6. Apparatus in accordance with claim 1, wherein said supply conduit extends from said exit over the top of said tank and over the top of said pool.

7. Apparatus for maintaining the water level in a swimming pool comprising, in combination with a swimming pool, a relatively small container mounted outside and near said pool at the height at which said water level is to be maintained; a water-pressure-sensitive valve mounted within said container, said valve having an input and an output and being set so as to open and close in response to the water pressure exerted upon said valve by the presence of water in said container at a level which is respectively less than and more than a predetermined height; a water supply connected to the input of said valve, said valve opening to permit the discharge of water directly froms aid output into said pool through a path which does not communicate with the water in said small container when the water level in said container falls below said predetermined height, and closing to prevent the discharge of water into said pool when the water level in said container in such a manner that whenever the level in the pool drops, thereby causing the level in the small container to drop correspondingly, said valve is actuated in response to the consequent drop in the head of pressure in said small container so as to supply the flow of water into said pool; an information aperture in the side of the pool; and a water-conducting connection between said container and said pool through said information aperture for equalizing the water level ins aid container and said pool, said water-conducting connection having a portion extending into said pool and having at least one aperture which is below the level of the water in said pool at all times during operation of said apparatus, so that there is a continuous flow of water between said pool and said small container.

8. An automatic water level keeper in accordance with claim 7, wherein said pool includes a recycle system delivering recycled water to said pool through a recycle aperture in the wall thereof, and wherein said connection passes through said recycle aperture.

* * * * *